United States Patent Office 3,219,550
Patented Nov. 23, 1965

3,219,550
DEHYDRATION OF METHYLHYDRAZINE
David Horvitz, Cincinnati, Ohio, assignor, by mesne assignments, to FMC Corporation, New York, N.Y., a corporation of Delaware
No Drawing. Filed June 21, 1961, Ser. No. 118,529
7 Claims. (Cl. 202—57)

This invention relates to a novel process for the dehydration of methylhydrazine, and more particularly to the recovery of substantially anhydrous methylhydrazine from aqueous solutions thereof by distillation methods.

Methylhydrazine is useful both as an ingredient of high-energy fuels and as an intermediate in the synthesis of pharmaceuticals, dyes, and other commercial organic products. As a rocket propellant it can be used either alone or in combination with known oxidizers such as nitric acid with which it is hypergolic. Such applications are only possible or economically feasible after most or all of the water has been removed from the methyldrazine.

For the purpose of this invention, anhydrous methylhydrazine refers to nonomethylhydrazine 100% free of water, while methylhydrazine and water solutions thereof are defined as including both methylhydrazine and water.

Methods of manufacturing methylhydrazine ordinarily result in the production of dilute aqueous solutions of the compound from which, depending upon the particular use for which it is to be employed, a substantially anhydrous methylhydrazine (90–97% methylhydrazine), or an approximately 100% anhydrous methylhydrazine must be obtained.

Although methylhydrazine boils at 87–88° C., it cannot be fractionally distilled from water, because it forms a maximum boiling azeotrope with water. This azeotrope boils at about 105.2° C. and contains about 47.3% of methylhydrazine by weight. Therefore, on attempting to distill fractionally from an aqueous solution containing less than 47.3% of methylhydrazine by weight, the first substance that comes off is water. Theoretically it is possible, therefore, to enrich the methylhydrazine content up to a maximum of about 47%. However, because of the small difference in boiling points of water (100° C.) and the methyldrazine-water azeotrope (105.2° C.), it is difficult to effect enrichment beyond about 35–45%. If an aqueous solution contains an amount of methylhydrazine greater than 47.3%, it is possible to distill off dehydrated methylhydrazine until the concentration of the methylhydrazine in the solution has declined to the composition of its azeotrope. Further purification cannot then be achieved by conventional distillation.

Although methylhydrazine, like hydrazine and unsymmetrical dimethylhydrazine, is ordinarily obtained in manufacturing operations as a dilute solution, each of the dilute solutions of these substances behave very differently on distillation at atmospheric pressure.

In the hydrazine-water system, an azeotrope is formed in the approximate molecular proportions of 1:1, and a composition approximating hydrazine hydrate can be obtained as bottoms by fractionating the aqueous solution of hydrazine. To obtain more concentrated solutions of hydrazine by simple distillation is not feasible, since the constant boiling composition approximating hydrazine hydrate distills over without change in composition.

In the unsymmetrical dimethylhydrazine-water system, no such azetrope is formed and unsymmetrical dimethylhydrazine is more volatile than water. Removal of the unsymmetrical dimethylhydrazine overhead leaving water as bottoms is therefore theoretically possible. However, because of the peculiar shape of the vapor equilibrium curve in the unsymmetrical dimethylhydrazine-water system, this separation is not practical. The contrasting behavior of hydrazine and unsymmetrical dimethylhydrazine with respect to the distillation of aqueous solutions is set forth in U.S. Patent 2,876,176, Nicolaisen et al.

Methylhydrazine, in contrast to unsymmetrical dimethylhydrazine, but similar to hydrazine, forms an azeotrope, but the composition of the azeotrope is not in the simple 1:1 molecular ratio which is approximated by hydrazine and water, but is in about a 1:3 ratio of methylhydrazine and water. Moreover, the boiling points of these azeotropes differ markedly. Whereas the boiling point of the hydrazine-water azeotrope is about 120° C.; the boiling point of the methylhydrazine-water azeotrope, having the approximate composition of

$CH_3NHNH_2 \cdot 3H_2O$ is 105.2° C., and in the case of the methylhydrazine azeotrope only a 5° difference exists between its boiling point and the boiling point of water, making the problem of separation of the methylhydrazine from the water in its azeotrope exceedingly more difficult.

Thus it is seen that, although the general chemical structure of the three substances, hydrazine, unsymmetrical dimethylhydrazine, and methylhydrazine is similar, the peculiarly contrasting behavior of aqueous solutions of these three substances on distillation presents an entirely different problem with respect to obtaining these substances in substantially anhydrous condition.

It is an object of this invention to provide a simple and economical method for producing substantially anhydrous methylhydrazine from aqueous solutions thereof. Another object is to provide a novel process for producing 100% methylhydrazine from aqueous solutions thereof. A still further object is to provide an efficient method whereby methylhydrazine can be recovered in substantially 100% yields from aqueous methylhydrazine solutions.

According to the process of applicant's invention, it now has been found that by the addition of an alkali metal hydroxide, particularly sodium hydroxide and potassium hydroxide, to aqueous solutions of methylhydrazine it is possible to distill off enriched methylhydrazine solutions containing much greater concentrations of methylhydrazine than is contained in its azeotrope with water. By the addition of an appropriate quantity of the alkali metal hydroxide substantially anhydrous methylhydrazine (90–97% methylhydrazine) can be obtained in one distilling operation from aqueous solutions of any concentration. Fractional distillation of the substantially anhydrous solutions so obtained will give 100% anhydrous methylhydrazine.

Substantially 100% recovery of anhydrous methylhydrazine from aqueous methylhydrazine solutions containing less than 30% to 47% methylhydrazine concentration can be obtained by the steps of (1) distilling at a temperature of about 100° C. to obtain a methylhydrazine solution of 30 to 47% concentration, (2) distilling the methylhydrazine solution of 30 to 47% concentration at a temperature of about 86° to 104° C. in the presence of sodium hydroxide in an amount equivalent to one part by weight of sodium hydroxide to 0.7–2 parts by weight of water present in the aqueous methylhydrazine solution to obtain substantially anhydrous methylhydrazine, and (3) removing water from the pot residue by heat and recycling the concentrated pot residue. When starting with solutions containing more than the azeotropic concentration of methylhydrazine (greater than 47.3%), anhydrous methylhydrazine is first removed until the residue or bottoms concentration is approximately that of the azeotrope. This residue is then treated in accordance with step (2).

This process is carried out simply by dissolving the sodium hydroxide in the aqueous methylhydrazine solution, the sodium hydroxide being added either as a solid or in concentrated, aqueous form. The aqueous methylhydrazine solution is then heated and distilled. The sodium hydroxide holds the water back and permits substantially anhydrous methylhydrazine to be distilled directly out of the solution. The amount of sodium hydroxide to be added is based on the water that is present in the methylhydrazine solution, and for one part by weight of sodium hydroxide the water will range from 0.7–2.0 parts by weight. For example, in order to produce anhydrous methylhydrazine from a solution containing 40 grams of methylhydrazine and 60 grams of water, 86 to 30 grams of sodium hydroxide will be added. Lesser concentrations of sodium hydroxide will effect some enrichment but only to a degree which is too small for efficient operation. Higher concentrations of sodium hydroxide are effective but not necessary, since they may require higher temperatures and cause poorer recoveries. Either sodium hydroxide or potassium hydroxide may be employed in the above described process.

Minor amounts of impurities may be present in the methylhydrazine-water solutions. However, while not absolutely necessary, it is desirable that the starting materials should be substantially pure in order to decrease the amount of possible contaminants and to obtain reproducible results.

This procedure may be applied to methylhydrazine-water solutions of any concentration, but for economic reasons it is preferable to concentrate the methylhydrazine solutions as far as possible by direct distillation prior to the addition of the sodium hydroxide.

Distillations at subatmospheric or superatmospheric pressures may be conducted successfully, but it is not advisable to exceed two or three atmospheres in distillations involving methylhydrazine because overheating the vapors might possibly cause detonations.

Continuous distillation procedures as well as batch operations may be employed in practicing the method of this invention, the basic principle being unaffected by the manner of distillation. Continuous operation may be accomplished, for instance, by continuously feeding the dilute aqueous methylhydrazine solutions and sodium hydroxide to the still while continuously removing dehydrated methylhydrazine from the upper portion of the still and continuously removing aqueous sodium hydroxide solution from the bottom portion of the still. A portion of the sodium hydroxide solution removed from the still can be enriched with solid sodium hydroxide to serve as the sodium hydroxide fed to the still with the aqueous methylhydrazine, or it may be concentrated by boiling off the water before recycling. The amount of sodium hydroxide solution removed from the system depends upon the amount of water fed to the still in the aqueous methylhydrazine solution; such aqueous sodium hydroxide may be dehydrated to recover anhydrous sodium hydroxide or concentrated sodium hydroxide solutions, which can then be returned to the still and the cycle continued.

If a fractionating column is used, pure, anhydrous methylhydrazine can be taken off the top of the column directly, either in batch or continuous fashion. It is also possible to distill without the use of a fractionating column to obtain most of the methylhydrazine in a purity of 90–98%; this product can then be fractionally distilled to produce the completely anhydrous product. On fractional distillation, the sodium hydroxide and water stay in the bottom of the distillation flask. If lesser amounts of sodium hydroxide are added, the amount of anhydrous methylhydrazine that will be obtained by fractional distillation will be proportionately less. If greater amounts of sodium hydroxide are added, the excess sodium hydroxide will simply be retained in the bottom with the methylhydrazine-water composition.

This invention is further illustrated by the following examples, although it is not intended to limit the invention specifically thereto. All parts are by weight unless otherwise specified.

*Example I*

To 113 grams of an aqueous solution containing 32.1% of methylhydrazine (36.3 grams) were added 77 grams of sodium hydroxide pellets. The resulting solution was distilled without a fractionating column and the following cuts were removed:

| Cut No. | Temperature, °C. | Weight, grams | Methylhydrazine | |
|---|---|---|---|---|
| | | | Percent | Grams |
| 1 | 86.0–90.0 | 8.7 | 97.2 | 8.5 |
| 2 | 90.5–104 | 25.3 | 97.0 | 24.5 |
| 3 | 104 | 29.3 | 8.9 | 2.6 |
| | | | | 35.6 |

No methylhydrazine was left in the residue. Accordingly, the recovery of the methylhydrazine was 98.11% complete and 90.9% was obtained in purity of 97.0% or better. This product can be brought to 100% purity by fractional distillation.

*Example II*

To 462.7 grams of an aqueous solution containing 36.4% of methylhydrazine (168.3 grams) was added 442.5 grams of a 75% solution of sodium hydroxide in water. The resulting solution was distilled. There was obtained 163.7 grams of 96.0% methylhydrazine at a temperature range of 88.0° to 100° C. In the pot residue 10.6 grams of methylhydrazine remained. Not counting the material in the pot, the recovery was 93.3% of 96.0% pure product. The material in the pot can be obtained in a dilute form by continuing the distillation further. This dilute material can then be incorporated in a new batch.

*Example III*

To 474 grams of an aqueous solution containing 37.6% of methylhydrazine (178.4 grams) were added 150 grams of solid sodium hydroxide and 75 grams of a 50% aqueous solution of sodium hydroxide. The resulting solution contained 1 part of sodium hydroxide to 1.8 parts of water. On distillation without a fractionating column at a temperature of 88–104° C. 223 grams of 80% pure methylhydrazine (a 100% recovery) was obtained.

*Example IV*

To 402 grams of an aqueous solution containing 43.8% of methylhydrazine (176 grams) was added 224 grams of sodium hydroxide pellets. On distillation at a temperature of 88–104° C. there was obtained 209 grams of 81.8% pure methylhydrazine, representing a 97.2% recovery. The concentration of the distillate can be obtained as high as 95% to 98% if the more dilute portion of the distillate is not mixed with the bulk of the high concentration material. In general, it is preferred to recycle the more dilute product. In order to effect complete recovery of the methylhydrazine, the pot residue is diluted towards the end of the distillation. This permits all of the remaining methylhydrazine to be recovered in a dilute form suitable for recycle.

Various changes and modifications may be made in carrying out the present invention without departing from the spirit and scope thereof. Insofar as these changes and modifications are within the purview of the annexed claims, they are to be considered as part of my invention.

What is claimed is:

1. A method for dehydrating methylhydrazine which comprises distillating an aqueous methylhydrazine solution in the presence of an alkali metal hydroxide in an amount equal to one part by weight of said hydroxide for each 0.7 to 2 parts by weight of water present in said aqueous methylhydrazine solution and recovering the dehydrated methylhydrazine as vapors from the distillation.

2. The method of claim 1 wherein said alkali metal hydroxide is sodium hydroxide.

3. The method of claim 1 wherein said alkali metal hydroxide is potassium hydroxide.

4. The method of claim 1 wherein said aqueous methylhydrazine solution is initially of about 30–47% concentration.

5. A continuous process for dehydrating methylhydrazine which comprises continuously feeding dilute aqueous methylhydrazine solutions and an amount of sodium hydroxide equal to one part by weight for each 0.7 to 2 parts by weight of water present in said aqueous methylhydrazine solution to a still while continuously removing dehydrated methylhydrazine from the upper portion of said still and continuously removing aqueous sodium hydroxide solution from the bottom portion of said still.

6. A method of preparing methylhydrazine of essentially 100% concentration comprising distilling an aqueous solution of methylhydrazine containing 30–47% water at a temperature of 86° to 104° C. in the presence of sodium hydroxide in an amount equal to one part by weight of sodium hydroxide to 0.7–2 parts by weight of the water present in the aqueous methylhydrazine solution, to obtain a distillate of 90–97% concentration, and then fractionally distilling said distillate of 90–97% methylhydrazine concentration to obtain 100% anhydrous methylhydrazine.

7. A method for obtaining substantially 100% recovery of anhydrous methylhydrazine from aqueous methylhydrazine solutions containing less than about 30% methylhydrazine comprising distilling at a temperature of about 100° C. to obtain a methylhydrazine solution of 30–47% concentration, distilling said methylhydrazine solution of 30–47% concentration at a temperature in the range of about 86° to 104° C. in the presence of sodium hydroxide in an amount equivalent to one part by weight of sodium hydroxide to 0.7–2 parts by weight of water present in said aqueous methylhydrazine solution to obtain substantially anhydrous methylhydrazine, diluting the pot residue with water and distilling off the remainder of the methylhydrazine in dilute form for recycle and recycling the dilute pot residue after concentration.

References Cited by the Examiner
UNITED STATES PATENTS 2,876,173   3/1959   Nicolaisen _____ 260—583

FOREIGN PATENTS 737,739   2/1952   Great Britain.
763,642   12/1956   Great Britain.

OTHER REFERENCES

Journal of the American Chemical Society, volume 76, Audrieth et al., No. 19, October 15, 1954, Easton, Pa., (pages 4869–4871 relied upon).

"Techniques of Organic Chemistry," volume IV, Distillation; Weissberger (pages 366 and 367—Carlson), Interscience Pub. Inc., N.Y., 1951.

NORMAN YUDKOFF, *Primary Examiner.*

LEON ZITVER, *Examiner.*